DIGITAL TO ANALOG CONVERTER UTILIZING A FUNCTION GENERATOR

Filed Dec. 16, 1963 2 Sheets-Sheet 1

INVENTOR.
WALTER K. FRENCH
BY John J. Goodwin
ATTORNEY

June 21, 1966 W. K. FRENCH 3,257,657

DIGITAL TO ANALOG CONVERTER UTILIZING A FUNCTION GENERATOR

Filed Dec. 16, 1963 2 Sheets-Sheet 2

3,257,657
United States Patent Office
Patented June 21, 1966

3,257,657

DIGITAL TO ANALOG CONVERTER UTILIZING A FUNCTION GENERATOR

Walter K. French, Montrose, N.Y., assignor to International Business Machines Corporation, New York, N.Y., a corporation of New York Filed Dec. 16, 1963, Ser. No. 330,880
6 Claims. (Cl. 340—347)

The present invention relates to electrical code systems and more particularly to apparatus for decoding binary code signals into electrical analog signals.

In information interchange systems, for example, for speech or other data, it is common that the data is transmitted in binary pulse code form. Upon reception of the binary coded signals, apparatus is required to decode such signals into their original analog form.

An object of the present invention is to provide an improved apparatus for converting coded binary signals into representative analog signals.

Another object of the present invention is to provide a reliable binary to analog converter of relatively simple construction.

The foregoing and other objects, features and advantages of the invention will be apparent from the following more particular description of a preferred embodiment of the invention, as illustrated in the accompanying drawings.

Figure 1:
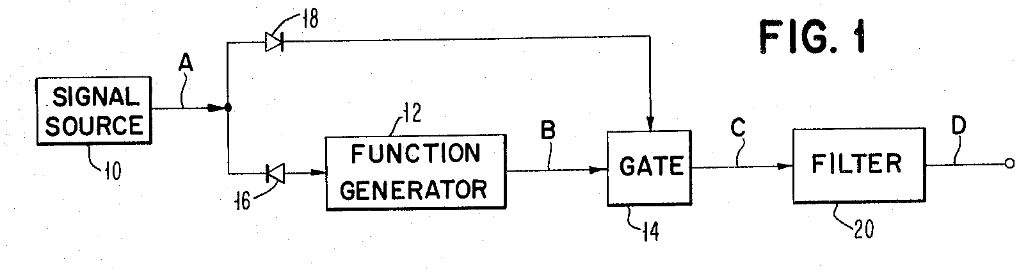
FIG. 1 is a schematic block diagram of a digital to analog converter system in accordance with the principles of the present invention.

Referring to FIG. 1, a decoding system is shown including a signal source 10 for providing coded data signals. The signal source 10 may, for example, be a remote transmitter. The binary signals may be in the form of a particular code. An example of one form of typical coded data signals are shown by waveform A of FIG. 2. The signals of waveform A are of the pulse code modulation or PCM type and may represent analog qualities such as speech signals. In waveform A, the negative bit pulses are synchronizing pulses which separate discrete word periods. The synchronizing bit pulses are either included in the transmitted PCM code signals or are added at the receiver by a synchronous clock. Interleaved between the synchronizing bit pulses are a plurality of data bit pulses, the number and position of which are representative of the coded information. In the present example there may be a maximum of six equally time spaced pulses (bits) in each word period. A pulse in the first bit position is assigned a value of thirty-two, a pulse in the second bit position has a value of sixteen, a pulse in the third bit position has a value of eight, a pulse in the fourth bit position has a value of four, a pulse in the fifth bit position has a value of two and a pulse in the sixth bit position has a value of one. Thus, a word period having pulses in all six bit positions (i.e., 111111) has a total value of 63 and will represent the most positive voltage value of the resultant analog signal. A word period having no pulses (i.e., 000000) has a value of zero and will represent the lowest voltage value of the resultant analog signal.

Figure 2:
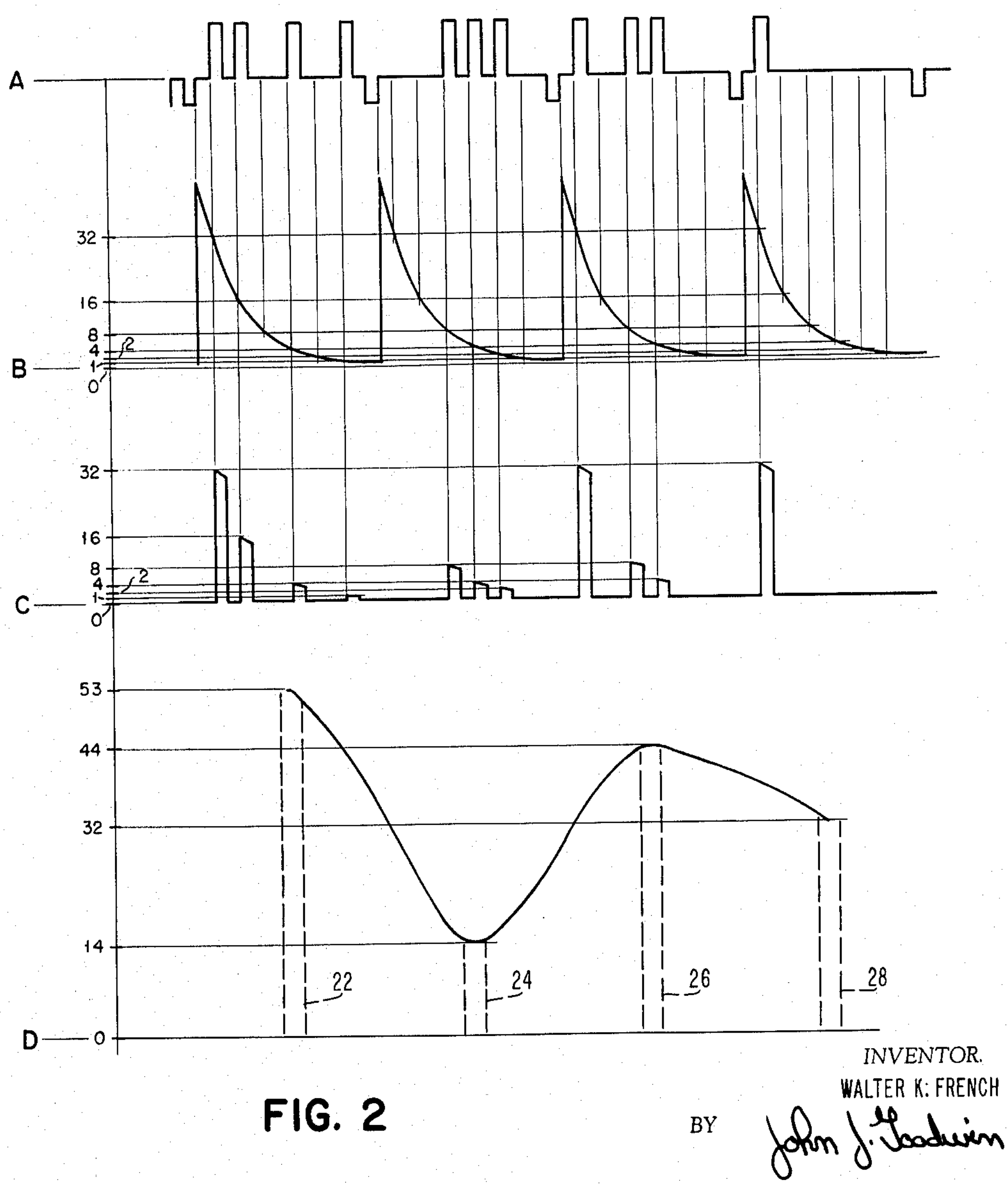
FIG. 2 is an illustration of several waveform signals which occur at various points of the system of FIG. 1 for one type of input signal.

Referring to waveform A of FIG. 2, it can be seen that the first word period represents a value of $$32+16+4+1=53$$

the second word period represents a value of $$8+4+2=14$$

the third word period represents a value of $$32+8+4=44$$

and the fourth word period represents a value of 32. It should be evident to one skilled in the art that the value that a word period represents can vary in value from zero to 63 (in units of one) as determined by the presence and absence of data pulses in the six bit positions.

Referring again to FIG. 1, the waveform A is produced by signal source 10 which is in turn connected to a function generator 12 via a diode 16 and to a gate circuit 14 via a diode 18. Diode 16 is connected between in the reverse direction to block all positive pulses from function generator 12 so that only the negative synchronizing signals are applied to function generator 12. Diode 18 is connected between in the forward direction to block and gate all negative pulses from gate circuit 14 so that only the positive data pulses are applied to gate circuit 14.

Function generator 12 is triggered by each negative synchronizing pulse to produce a voltage which varies in accordance with a given function during the duration of a word period (i.e., the duration of the six bit pulses). In the present example, the voltage function is one wherein the initial value is maximum and wherein the value is halved in six equal time increments.

Referring to waveform B of FIG. 2, the output voltage waveform for function generator 12 is shown. The waveforms are instituted by the trailing edge (i.e., positive going portion) of the negative synchronizing signal triggering function generator 12 (FIG. 1). The voltage then decays exponentially such that for equal given time periods the amplitude is one-half the previous value. Thus, the voltage is at a given value at the beginning of the first bit period of waveform A. The voltage then decays so that it is at one-half the given value at the beginning of the second data bit period, at one-fourth the given value at the beginning of the third data bit period, one-eighth the given value at the beginning of the fourth data bit period, one-sixteenth the given value at the beginning of the fifth data bit period, and one-thirty-second the given value at the beginniing of the sixth data bit period. Stated another way, if the output voltage from function generator 12 is selected such that its amplitude is thirty-two units at the beginning of the first data bit period, then it will be sixteen units at the beginning of the second data bit period, eight units at the beginning of the third data bit period, four units at the beginning of the fourth data bit period, two units at the beginning of the fifth data bit period, and one unit at the beginning of the sixth data bit period. Thus, the voltages shown in waveform B decay in increments in the same value and sequence as the data bit pulses of the PCM coded signal shown in waveform A.

The output voltage signals from function generator 12 (FIG. 1) are applied to gate circuit 14. Gate circuit 14 is normally closed, and is opened only during the presence of a data bit pulse from input terminal 10. When gate circuit 14 is opened, it permits a portion of the waveform B applied at the input thereof to be gated through to filter 20. Thus the amplitude of the portion of waveform B gated through to filter 20 is dependent on which data bit pulse is applied to gate 14.

Referring to FIG. 2, the first synchronizing pulse of waveform A is responsible for triggering function generator 14 which produces an output voltage having an amplitude equivalent to thirty-two units synchronous with the beginning of the first data bit period following the synchronizing pulse. A data pulse is also present in the first bit position of waveform A at this time so that gate circuit 14 is opened and a voltage of thirty-two units amplitude is applied to filter 20 during the first data bit period. The waveform of the voltage applied to filter 20 is shown at C in FIG. 2.

At the beginning of the second data bit period the output voltage from function generator 12 has decreased to sixteen amplitude units, and, there being a data bit pulse present during such second bit period, the sixteen amplitude unit voltage is gated through to the input of filter 20 as shown by waveform C.

At the third data bit period time the output voltage from function generator 12 has decayed to eight amplitude units, however, there being no data bit pulse at this time, gate 14 remains closed and no voltage is applied to filter 20. At the fourth data bit period time the output voltage of function generator 12 has decayed to four amplitude units, and, there being a data bit pulse present at this time the four amplitude unit voltage is gated through gate circuit 14 to filter 20. In like manner it can be seen that the output voltage of function generator 12 of two amplitude units during the fifth data bit time will not be gated to filter 20, but the one amplitude unit value of function generator 12 will be gated to filter 20 by the presence of a data bit pulse in the sixth bit position of waveform A. The output voltage of function generator 12 continues to decay until it is reset to the maximum value by the next synchronizing pulse.

It can also be seen that during the second word period output voltages from function generator 12 having amplitudes of eight, four, and two units will be gated through gate circuit 14 to filter 20 by the data pulses in the third, fourth, and fifth data bit periods of the second word period of waveform A being applied to gate circuit 14 as gating pulses. Likewise in the third word period, the output voltage from function generator 12 having amplitudes of thirty-two, eight, and four units are applied to filter 20, and in the fourth word period, a thirty-two amplitude unit voltage from function generator 12 is gated through to filter 20.

Thus, during the first word period voltages having amplitudes of thirty-two, sixteen, four, and one units are applied to filter 20. The sum of these amplitudes total fifty-three, which is the value of the corresponding PCM word period of waveform A. Likewise the amplitude of the sum of the voltages gated to filter 20 in the second word period is fourteen, which is also the value of the binary code in the second word period of waveform A. The amplitude of the sum of the voltages gated to filter 20 in the third word period is forty-four (also the coded value) and the amplitude of the sum of the voltages gated to filter 20 in the fourth word period is thirty-two, also the coded value of the fourth word period.

Filter 20 is a conventional smoothing filter or low pass filter which effectively sums the energies of the signals applied thereto. Thus, filter 20 will sum the voltages gated thereto during the first word period into a signal having an amplitude of 53 units, as symbolically depicted by the equivalent PAM pulse represented by the dotted portion 22 of waveform D (FIG. 2) which represents the output signal from filter 20. The voltages applied during the second word period are summed into a signal having an amplitude of fourteen, as symbolically represented by dotted portion 24 of waveform D, the voltages applied to filter 20 during the third word period are summed into a signal of amplitude forty-four (represented by dotted portion 26 of waveform D) and the voltages applied to filter 20 during the fourth word period are summed into a signal of amplitude thirty-two (represented by dotted portion 28 of waveform D). The actual signal from filter 20 is represented by the envelope 30 of waveform D, which is the analog equivalent of the binary coded signal of waveform A. Thus if waveform A represented speech signals coded into binary form for transmission purposes, the signal from filter 20 as represented by waveform D is the corresponding analog speech wave.

Figure 3:
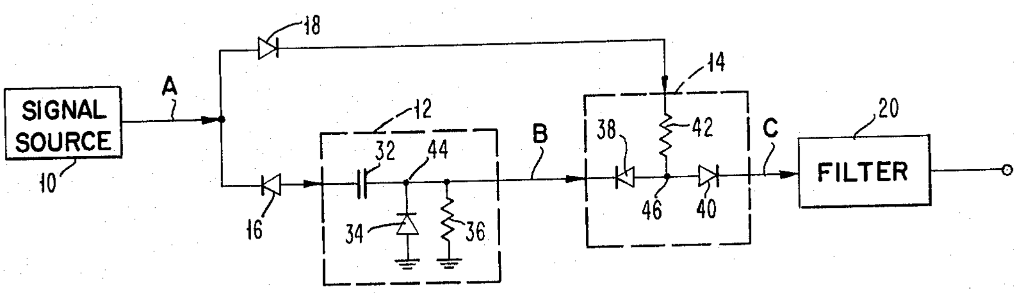
FIG. 3 is a detailed circuit of one embodiment of the system of FIG. 1.

The function generator 12, the gate circuit 14, and the filter 20 of FIG. 1 are conventional structures and are not restricted to a particular design, however, one possible design for function generator 12 and gate circuit 14 are shown in FIG. 3. The system of FIG. 3 is the same as the system of FIG. 1, and the same reference numbers are employed for corresponding elements. Function generator 12 includes a capacitor 32, a diode 34, and a resistor 36. Gate circuit 14 includes two diodes 38 and 40 connected back to back between function generator 12 and filter 20, and a resistor 42 connected between the junction of diodes 38 and 40 and diode 18.

The circuit of FIG. 3 operates as follows. The occurrence of the negative synchronizing signal from signal source 10 is connected through diode 16 and lowers the potential on the input side of capacitor 32. This causes diode 34 to conduct and clamp junction 44 at reference (ground) potential. The positive going portion of the synchronizing voltage pulse (the trailing edge) raises the potential at junction 44 a like amount above reference potential. This represents the initial positive level of the output voltage from function generator 12 as shown in waveform B, FIG. 2. In FIG. 3, the positive potential will decrease as capacitor 32 discharges through resistor 36. The values of capacitor 32 and resistor 36 are selected to provide a time constant which produces the desired voltage decay as shown in waveform B, FIG. 2. Upon the occurrence of a positive data pulse conducted through diode 18 and applied across resistor 42 of gate circuit 14, diodes 38 and 40 conduct and the voltage at junction 46 increases to a level equal to the voltage level of junction 44. The voltage at junction 46 is therefore the output voltage of gate circuit 14. The advantage of the particular circuit shown in FIG. 3 is that the desired results are carried out entirely with passive circuit elements.

The present invention is not restricted to the decoding of data in the PCM code representing a straight binary progression. Any binary codes of the type wherein the value of a data pulse is not dependent on the other data pulses in the word period may be converted to their analog representation by selection of the voltage function produced by voltage generator 12.

Consider the binary coded decimal or BCD code. The BCD code is one wherein each digit in a decimal number is represented by a four bit binary number. For example, the number ten (10) is represented as 0001 0000, number twenty-two (22) as 0010 0010, and the number eight hundred and sixty-three (863) as 1000 0110 0011. Limiting the present example to two digit numbers for simplicity, each number would require a code pulse period having eight data bit periods having the relative values eighty, forty, twenty, ten, eight, four, two, and one.

Figure 4:
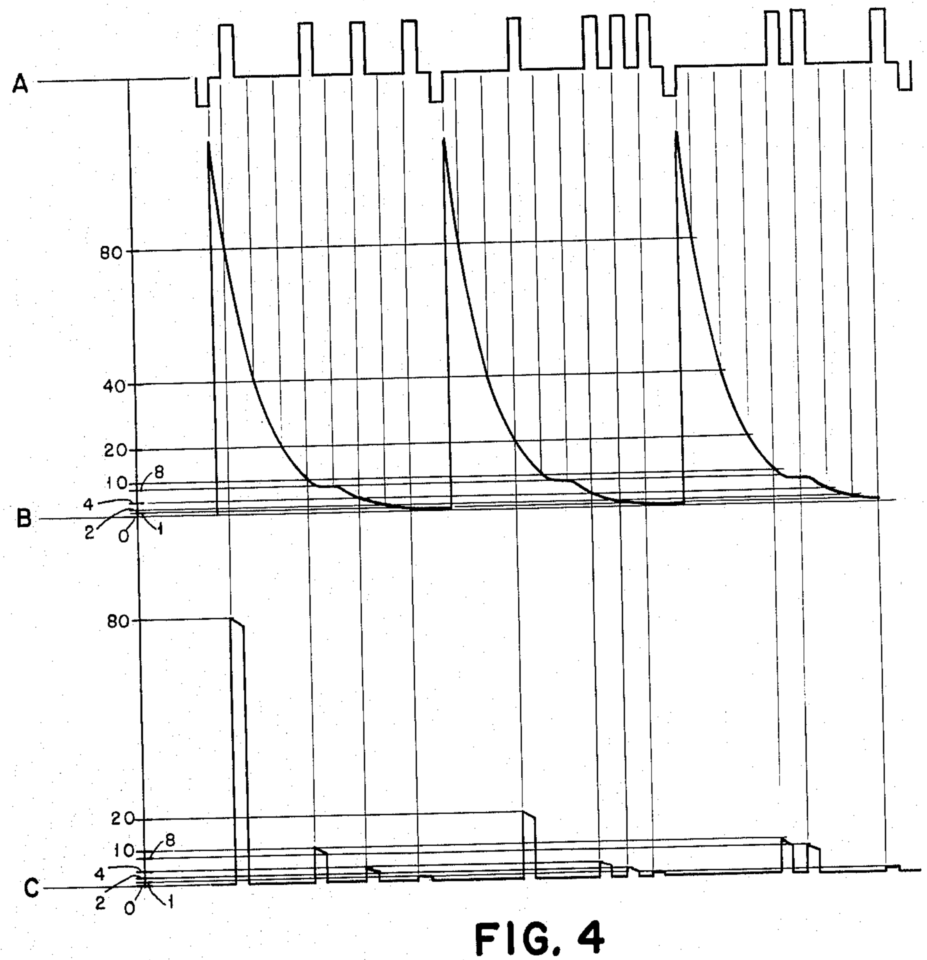
FIG. 4 is an illustration of several waveform signals which occur at various points of the system of FIG. 1 for another type of input signal.

In FIG. 4, the waveform A represents the BCD signal for the values ninety-five, twenty-seven, and nineteen. Waveform B of FIG. 4 represents the output voltage of function generator 12 (FIG. 1) for the BCD code embodiment. It is noted that the waveform B of FIG. 4 commences at a given amplitude and decreases to an amplitude of eighty units at the beginning of the first bit period of waveform A and thereafter uniformly decreases to forty, twenty, and ten units in time increments equal to the bit rate of waveform A. The next amplitude level on the bit period after the ten, however, is eight, causing a discontinuity in the waveform, after which the decrease is again uniform to four, two, and one amplitude units. The result of gating waveform B with the pulses of waveform A at gate circuit 14 (FIG. 1) results in an output signal from gate circuit 14 as shown in waveform C of FIG. 4. After passing waveform signal C through filter 20 of FIG. 1, an analog signal will result having an envelope which varies in amplitude from ninety-five to twenty-seven to nineteen units.

It will be obvious to one skilled in the art that the function depicted by waveform B of FIG. 4 may be easily produced, as well as any other desired voltage function either by electronic circuits or by a potentiometer wound to produce the desired function.

What has been described is an improved decoder for converting binary coded signals to their analog equivalents. The system described is reliable and of simple construction, and may be adapted to operate with a wide variety of different binary codes.

While the invention has been particularly shown and described with reference to a preferred embodiment thereof, it will be understood by those skilled in the art that various changes in form and details may be made therein without departing from the spirit and scope of the invention.

What is claimed is:

1. A system for decoding digital code signals into an analog signal comprising:

a source of data pulses having different scaler values, a source of waveform signal synchronous with said data pulses having an amplitude which varies proportionally with the scaler values of said data pulses in synchronism therewith, gating means coupled to said source of data pulses and said source of waveform signal for gating portions of said waveform signal in response to said data pulses, and summing means coupled to said gating means for summing said gated portions of said waveform signal into an analog signal representative of said data pulses.

2. A system for decoding digital code signals into an analog signal comprising:

a source of digital code signals of the type wherein separate increments of data are represented by at least one data pulse occurring within uniform word periods, each word period including a plurality of discrete bit positions having different assigned values such that a data pulse occupying a given bit position represents the value assigned to that given bit position, means for producing a series of identical waveform signals synchronous in time with each of said word period, the amplitude of said waveform signals occurring during each word period being representative of the value of time coincident bit positions, gating means coupled to said source of digital code signals and to said waveform signal producing means, said data pulses from said digital code signal source opening said gating means to permit said waveform signal to be transmitted through said gating means during the duration of said data pulses, and summing means responsive to said waveform signal transmitted through said gating means for producing an analog signal representative of said digital code signals.

3. A system for decoding according to claim 2 wherein the value assigned to each bit position within said word periods is independent of the values assigned to the other bit positions.

4. A system for decoding digital code signals according to claim 2 wherein the bit positions within each word period of said digital code signals are assigned values such that each bit position is one-half the value of the preceding adjacent bit position with the first bit position in each word period having the same initial value, and wherein said waveform signal has an initial amplitude in time coincidence with said first bit position of each of said word periods, and decreases in amplitude such that the amplitude of the waveform during the occurrence of each successive bit position of said word period is one-half the waveform amplitude during the preceding bit position time.

5. A system for decoding digital code signals according to claim 2 wherein said uniform word periods of said digital code signals are delineated by characteristic synchronizing pulses occurring therebetween, and wherein said means for producing a waveform signal is a function generator for producing said waveform signal in response to the occurrence of said synchronizing pulses.

6. A system for decoding digital code signals into an analog signal comprising a source of digital code signals of the type wherein separate increments of data are represented by at least one first polarity data pulse occurring within uniform word periods separated by second polarity synchronizing pulses, each word period including a plurality of discrete bit positions having different assigned values such that a data pulse occupying a given bit position represents the value assigned to that given bit position, a first diode having one side connected to said source of digital code signals for conducting said synchronizing pulses and blocking said data pulses, a capacitor having one side thereof connected to the other side of said first diode for establishing an electrical signal in response to said synchronizing pulses, a second diode and a first resistor connected in parallel between the other side of said capacitor and a source of reference potential for providing a path for the electrical signal in said capacitor to discharge at a given rate, a third diode having one side connected to said source of digital code signals for conducting said data pulses and blocking said synchronizing pulses, a second resistor having one side connected to the other side of said third diode, a fourth diode connected to the other side of said second resistor and the other side of said capacitor to block the electrical signal discharging from said capacitor in the absence of data pulses from said source of digital code signals, said fourth diode conducting in response to said data pulses from said source of digital code signals and thereby placing the junction of said fourth diode and said second resistor at a signal level equal to the signal level at said other side of said capacitor, a fifth diode having one side connected to the junction between said fourth diode and said second resistor for conducting said electrical signal from said capacitor upon the occurrence of said data pulses, and a filter connected to the other side of said fifth filter for smoothing the electrical signal conducted therethrough to provide an analog signal representative of said digital code signal.

References Cited by the Examiner

UNITED STATES PATENTS

| | | | |
|---|---|---|---|
| 2,986,727 | 5/1961 | Macklem | 340—347 |
| 3,080,555 | 3/1963 | Vadus et al. | 340—347 |
| 3,110,802 | 11/1963 | Ingham et al. | 235—197 |
| 3,128,377 | 4/1964 | Goddard | 235—197 |

DARYL W. COOK, *Acting Primary Examiner.*

MALCOLM A. MORRISON, *Examiner.*

K. R. STEVENS, *Assistant Examiner.*